3,236,671
METHOD OF REDUCING SEEPAGE LOSS FROM
CONTAINED BODIES OF WATER
Jack N. Dybalski and Paul L. Du Brow, Chicago, Ill., and Alan S. Michaels, Lexington, Mass., assignors to Armour and Company, Chicago, Ill., a corporation of Delaware
No Drawing. Filed Mar. 2, 1964, Ser. No. 348,790
12 Claims. (Cl. 106—277)

This application is a continuation-in-part of our co-pending application Serial No. 108,287, filed May 8, 1961, now abandoned.

This invention relates to a method of reducing seepage loss from contained bodies of water. The invention has particular application in the storage and utilization of water by means of canals, reservoirs, and the like where the contained body of water is subject to seepage loss by permeation of the underlying containing material. The method of this invention may also be of value for reducing erosion of the containing material for irrigation ditches, canals, or other water transfer structures.

Asphalt emulsions have been used in the impermeabilization or consolidation of porous ground structures. Heretofore these emulsions were injected into loose soils or sub-soils such as sands to bring about the desired fixation. However, these methods require either dry or substantially dry conditions to achieve the desired results. The concept of impermeabilizing and consolidating naturally occurring and synthetically produced porous materials such as earthy masses, sub-soil sand, gravel layers, masonry or concrete structures, stone dumpings, and the like, which form a part of a static or ambient liquid containing system, without the need for draining the system, has long intrigued researchers in this field. Heretofore, no successful method has been found for achieving this end.

The very apparent need for such a method of bringing about impermeabilization and consolidation of such materials is cogently demonstrated by the problem encountered in irrigation systems. As much as 50% of the water passing through irrigation canals is lost through seepage. This is particularly true in areas where the irrigation canals are constructed on highly porous non-cohesive soils or sub-soils such as sand. This tremendous loss of water in areas having very little rainfall or no access to a constant supply of water, of course, creates serious problems not only from the economic standpoint but from the standpoint that a sufficiently high standard of living for the inhabitants cannot be maintained. In certain of these areas, drastic measures have been taken to impede this loss of valuable water resources. Such steps have taken the form of lining the irrigation canals with brick or concrete. However, these consolidated linings rapidly develop cracks due to hydraulic pressure fluctuation and shifting of unstable base soils. The valve of such linings is therefore largely limited to control the erosion and improving maintenance, as they are ineffective for preventing seepage losses for very long.

In the west and southwest areas of the United States asphalt beds have been employed to alleviate water losses. These beds are generally laid before water is permitted to flow through the canals and require special treatment and equipment, in addition to a substantial labor force to lay the asphalt. Beds prepared in this manner, like the brick and concrete lined beds, develop cracks and crevices which cannot be readily repaired by presently known methods.

Another serious problem, aside from loss of water through seepage, is the problem of erosion of canals and river beds, and the like, caused by the flow of water through these systems carrying silt and particles of soil which eventually build up at bends in the beds. Erosion and collapse of the sides or retaining walls of such systems is also a common occurrence.

It is therefore a principal object of the present invention to provide an improved method for overcoming and alleviating the problems described above. More specifically, it is the object of the present invention to provide a method of reducing seepage loss from contained bodies of water where the loss occurs by permeation of the underlying containing material, whether the base material is a consolidated lining which has become cracked, or is a porous soil or aggregate material. A related object is to provide a method for controlling and limiting erosion of canals, irrigation ditches, and the like, which is particularly applicable to unlined structures for conveying water along the surface of the ground. Further objects and advantages will be indicated in the following detailed specification.

This invention is based in part on the discovery of a surprising property of cationic bituminous emulsions of the oil-in-water type. With such emulsions, the water forms the continuous phase and the bitumen, such as asphalt, forms the dispersed phase. Such emulsions also contain a cationic emulsifier for the bituminous phase. Aqueous cationic bituminous emulsions are ordinarily applied directly to the soil or aggregate material which is to be consolidated or impermeabilized. Consequently, when such emulsions were to be used to prevent seepage loss from contained bodies of water, it was thought to be necessary to first drain the body of water so that the surface of the containing material was exposed for treatment. It has now been discovered, however, that a substantial reduction in seepage loss can be obtained by the simple expedient of dispersing a relatively small quantity of the cationic bituminous emulsion in the body of water, and permitting the droplets of the bitumen to deposit on and in the underlying containing material for the body of water. Although the bitumen when introduced into the body of water becomes highly dispersed and diluted, it nevertheless manifests an affinity for the underlying containing material, which results in relatively rapid clearing and depositing of the bitumen. This action is believed to be primarily electrical in nature, although the seepage flow also tends to direct the dispersed bitumen toward and into the base material. Within a period as short as twelve hours, and rarely longer than 24 to 48 hours, the permeability of the base material is substantially reduced and seepage loss is greatly curtailed. It will be appreciated that this discovery is of great economic importance, since it permits treatment of bodies of water to reduce seepage loss without the need for draining the canal, reservoir, irrigation ditch, etc. It will be understood of course that the method is not limited to use with man-made ground surface structures, but is also applicable to natural ponds, lakes, streams, etc. Its principal field of use, however, will be in connection with the storage and utilization of water by means of artificially constructed canals, reservoirs, irrigation ditches, and the like.

In practicing the method of this invention, the aqueous cationic bituminous emulsion is formed in the usual way to obtain a substantially stable emulsion of the oil-in-water type. In one convenient procedure, the water for the emulsion is introduced into a tank and heated to a temperature of approximately 120° F. The cationic emulsifier is then mixed with the water. If the emulsifier is a free amine, an acid can be included, such as hydrochloric acid, thereby converting the amine to its water-soluble salt. The aqueous solution of the emulsifier is then pumped to a colloid mill and injected simultaneously therein with the molten asphalt. Finished emulsion is pumped from the colloid mill to emulsion storage. Usually the emulsions will contain between about 20 and 80% of the bituminous binder based on the total weight of the emulsion. The preferred emulsions have a bituminous binder content of from about 50 to 70% by weight. The amount of cationic compound employed as an emulsifier will range from 0.1% to about 2.0% based on the weight of the emulsion, with amounts of about 0.6 to about 1.0 or 1.5% being preferred. These details are also described more fully in the cited co-pending applications Serial Nos. 327,794 and 327,805.

The method of this invention does not depend for its success on the use of any particular cationic emulsifier or class of such emulsifiers. In general, those cationic emulsifiers can be employed which have heretofore been found to be effective for forming oil-in-water emulsions of asphalts or other bitumens. More specifically, the aliphatic amines and quaternaries may be employed. The polyamine compounds are usually preferred to monoamines. For example, the aliphatic diamine compounds can be used, such as the aliphatic trimethylene diamines. The amines should be employed in the form of their water-soluble salt, which can readily be prepared by reacting the free amines with a suitable acid such as hydrochloric acid. Water-soluble quaternium ammonium compounds are also suitable, and both mono- and poly-quaternaries may be used. For example, the diquaternaries are quite suitable. It will be understood that the cationic emulsifiers should contain at least one aliphatic hydrocarbon group of from 8 to 22 carbon atoms. Usually, aliphatic hydrocarbon chains of from 12 to 18 carbon atoms are advantageous.

By way of further illustration, the following cationic emulsifiers are suitable:

(1) The N-alkyl polymethylene diamines—

$$R-NH(CH_2)_wNH_2$$

where $w$ is an integer of from 2 to 4;

(2) The N-alkyl polymethylene mono- and polyalkoxylated diamines—

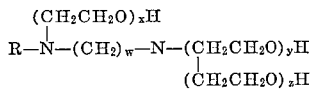

where $w$ is an integer of from 2 to 4, $x$, $y$, and $z$ are integers of from 0 to 20 with the total of $x$, $y$, and $z$ not exceeding 20;

(3) The amido amines—

$$R-C=O-NH(CH_2)_w-NH-(CH_2)_wNH_2$$

where $w$ is an integer of from 2 to 4;

(4) The heterocyclic amines including N-amino ethyl imidazoline, N-amino ethyl piperazine, gloxalidine and oxazoline;

(5) The alkyl and alkyl polyalkoxylated quarternary ammonium compounds—

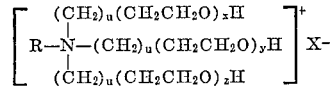

where $u$ is an integer of from 0 to 2; $x$, $y$, and $z$ are integers of from 0 to 25 with the total of $x$, $y$, and $z$ not exceeding 20, and $x$ is an anion such as $SO_4^=$, $NO_3^-$, $Cl^-$, $Br^-$ or $OH$ to match the valency of the quaternary group; and (6) The alkyl and alkyl polyalkoxylated diquaternary ammonium compounds illustrated by the general formula—

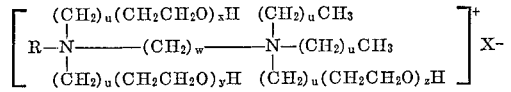

where $u$ is an integer of from 0 to 2, $w$ is an integer of from 2 to 4, $x$, $y$, and $z$ are integers of from 0 to 20 with the total of $x$, $y$, and $z$ not exceeding 20, and $x$ is an anion such as $SO_4^-$, $NO_3^-$, $Br^-$, $Cl^-$ or $OH^-$ to match the valency of the diquaternary group.

In the foregoing formulae, the letter "R" represents an aliphatic hydrocarbon group, which may contain from 8 to 22 carbon atoms, or preferably from 12 to 18 carbons. It will usually be derived from natural fatty acids or fatty acid mixtures. Specific commercially available cationic emulsifiers which may be utilized are: tallow trimethyl ammonium chloride, oleyl trimethyl ammonium chloride, the reaction produce of tallow trimethyl ammonium chloride, or oleyl trimethyl ammonium chloride with two moles of ethylene oxide, N-tallow, N, N-dimethyl, N', N', N'-trimethyl 1,3-propane diammonium chloride, and the water-soluble salts, such as the chloride sale of tallow 1,3-propylene diamine, and the reaction product of this compound with three moles of ethylene oxide.

In preparing aqueous emulsions from amine emulsifiers, it is preferred to employ the emulsifier in combination with an organic acid such as formic, acetic, propionic, or sulfonic acid, or an inorganic acid such as hydrochloric, phosphoric, nitric, sulfuric, perchloric, hypochlorous, and the like. The amount of acid used may vary from about 0.1% to about 10.0% based on the weight of the emulsion, with from 0.2% to about 1.0% being preferred. An excess of acid has been found to be helpful in maintaining the stability of the emulsions, therefore, the majority of our formulations are calculated to incluude at least a 10% excess of acid. The preferred acid for the purposes of this invention is hydrochloric acid.

Addition of an acid, for example, hydrochloric, to either of the N-alkyl polymethylene diamines or the N-alkyl polymethylene mono and polyethoxylated diamines suitable for the purposes of this invention results in a chemical reaction between the basic diamines and the acid to form the corresponding hydrochloride salt of the diamines. The same type of reaction occurs with the amido-amines and the heterocyclic amines contemplated by this invention. This reaction product is highly polar and substantive, and possesses a unique hydrophillic-hydrophobic balance which enables emulsification to occur. A preferred technique is to form a pre-prepared solution of the water soluble acid salts of these amines and a desired acid. The pre-prepared solution and molten asphalt may then be combined simultaneously with high shear agitation to form a fine particle size emulsion.

When using a quaternary ammonium compound as the emulsifier, it is generally not necessary to incorporate an acid into the emulsion. Since these compounds usually are employed in the form of salts or hydroxides, no further chemical reaction is required. However, addition of an acid may be necessary to control the pH of the emulsion.

The pH of our emulsions may range from about 1 to about 10, with a range from about 2 to about 7 being preferred. Experience has demonstrated that emulsions utilizing amine or diamine emulsifiers are more mechanically stable and have better viscosity control properties when made with a pH on the acid side. This does not, however, exclude the production of effective, stable emulsions in a neutral or alkaline media, especially with quaternary emulsifiers.

Although proper adjustment of pH contributes to the stability of the emulsions, we have discovered that this property may be enhanced by the addition of certain modifying agents. Substantially increased storage stability for the entire emulsion system, for example, may be achieved by addition to the emulsion water prior to emulsification of minor proportions of an alkali or alkaline earth metal salt such as calcium chloride or sodium chloride. The amount of modifier that may be added to the emulsion may vary from about 0.01% to about 5.0% based on the weight of the emulsion, with from above 0.1% to above 1.0% being preferred. Incorporation of the modifier has the effect of increasing the storage stability of the emulsions.

Although the cationic emulsifier may be added to the bituminous binder or to the aqueous phase, it is preferred to add it to the aqueous phase. A particularly advantageous method of preparing our emulsions is to maintain the binder at a temperature of from 180° F to about 350° F. The preferred temperature is about 250° F. The acid and amine or quaternary and modifying material are preferably added to the continuous water phase which is maintained at a temperature of from about 32° F. to about 212° F. The preferred temperature range is about 115° F. to about 125° F.

The continuous phase containing the emulsifier composition is then blended simultaneously with agitation with the bituminous binder. An industrial homogenizer or colloid mill may be employed as a mixer in this operation.

The particle size of the emulsions may range anywhere from a half a micron to 100 microns. However, when the particle size approaches 100 microns, the emulsion is not as satisfactory and it therefore is preferred to keep the particle size as small as possible. Particle sizes of less than 10 microns give the most satisfactory results.

The emulsions described hereinabove may be introduced into a static or ambient water by any suitable means which includes hosing, pumping, spraying, ponding or just dumping. The emulsion may be introduced into the water at sub-surface or surface levels. In introducing our emulsions into the body of water, the point or points of introduction will be dependent on the area of the system. For wide areas, the emulsions should be introduced along the periphery and in the center. For narrow areas, peripheral introduction is sufficient.

Upon introduction of the emulsion into the water, the particles of the bituminous binder migrate to the walls and bed of the system. This migratory action can be observed both in experimental procedures and in actual practice. The migration seems to be directed in its action. Although we cannot adequately explain this activity, we believe that it is electrochemical in nature. It is believed that each particle of bituminous binder bears a positive charge. Having this strong charge on it, these particles migrate to the sub-soil which may have either a positive or negative charge. The fact that the charge may be positive does not affect the activity of the charged particles of our emulsions. They still adsorb onto these positively charged soil particles due to the inherent characteristics of the nitrogenous compounds employed in our emulsions as emulsifiers. These nitrogenous compounds are believed to possess a high energy bonding property which permits this action. This high energy bonding property seems to be sufficient to overcome what we would normally believe to be the repulsive electro chemical forces characteristic of particles bearing like charges. The adsorbed particles are strongly held to the charged soil particles whether they be positively or negatively charged, or in the complete absence of charge.

The amount of emulsion to be used to coat a particular area of a liquid containing system may be based upon a calculation of the total surface area. In one such system we employed approximately half a gallon of emulsion per square yard of soil surface to be coated. This emulsion contained approximately 65% bituminous binder. In the highly permeable soil of the system a deposition of 2.6 pounds of asphalt for each square yard of surface area treated reduced seepage from 5.21 cubic feet of water per square foot of surface area per day to 0.32 cubic foot of water per square foot of surface area per day. This amounts to a reduction in seepage of approximately 95.1%. This result was achieved in a period from 24 to 48 hours.

The degree of penetration obtained with our emulsions ranges up to 8 inches in highly permeable soils such as sands. From the standpoint of seepage stoppage, of course, this is very desirable. A merely topical film would not be long lasting and could be ruptured by hydraulic pressures and movements of the sub-soil. Due to the excellent penetration characteristic of our emulsions, it is possible to achieve considerable stabilization of both the sides and beds of liquid containing systems thereby substantially overcoming seepage and erosion difficulties.

From what has been previously said, it will be understood that the method of this invention can be advantageously applied to both lined and unlined canals, reservoirs, and the like. More specifically, it is applicable to contained bodies of water where the underlying containing material is soil or other natural porous material. It is also applicable where the containing material includes a consolidated lining, such as a lining of brick, concrete, asphalt, etc. It will be understood that such linings will normally be permeable due to cracks thereto, and this provides the need for the treatment of the present invention.

For flowing bodies of water, such as those found in canals, irrigation ditches, etc., it will usually be desirable to construct temporary dams for holding the water under essentially static conditions while the treatment is applied. This will assure a more uniform and complete distribution of the asphalt sealant. Instead of calculating the amount of asphalt or other bitumen to be employed on the basis of the surface area of the containing material, the amount employed may be based on the volume of the water in the system being treated. For example, the amount of asphalt or bitumen dispersed into the water usually will fall within the range from 100 to 10,000 p.p.m. (parts per million), while the preferred concentration will range from about 1,000 to 3,000 p.p.m. of the asphalt based on the total water being treated.

The following specific examples further illustrate the invention.

EXAMPLE I.—SEEPAGE REDUCTION—STATIC

Static seepage evaluations were obtained employing an 8″ diameter Büchner funnel containing a ¾″ layer of sand with a 4″ head of water. Emulsions were added to the water and seepage rates were measured over a three minute period.

Emulsion formulations used in the test were as follows:

*No. 7*

| | Percent |
|---|---|
| Asphalt | 60 |
| Water | 40 |
| 1-(2-aminoethyl)-2-alkyl-2-imidazoline | 0.3 |
| Acetic acid (glacial) | 0.15 |
| $CaCl_2$ (anhydrous) | 0.10 |

*No. 8*

| | |
|---|---|
| Asphalt | 60 |
| Water | 40 |
| 1-(2-aminoethyl)-2-alkyl-2-imidazoline | 0.3 |
| HCl (conc.) | 0.15 |
| $CaCl_2$ (anhydrous) | 0.10 |

*No. 136*

| | |
|---|---|
| Asphalt | 60 |
| Water | 40 |
| Duomeen T[1] amido-amine | 0.5 |
| Acetic acid (glacial) | 0.3 |
| $CaCl_2$ (anhydrous) | 0.2 |

[1] The term Duomeen is a trademark applied to N-alkyltrimethylene diamines, and the letter "T" indicates that the alkyl group comprises mixtures of aliphatic hydro-carbon radicals such as are derived from tallow.

*No. 138*

| | |
|---|---|
| Asphalt | 60 |
| Water | 40 |
| Diethylene triamine amido-amine | 0.5 |
| Acetc acid (glacial) | 0.3 |
| $CaCl_2$ (anhydrous) | 0.1 |

The results of the seepage evaluations are as follows:

TABLE I

|  | Flow Rate at End of 3 Minutes | Percent Reduction |
|---|---|---|
| Control | 210 cc./min | |
| 5 cc. Emulsion No. 7 | 1 cc./min | 99+ |
| Control | 230 cc./Min | |
| 5 cc. Emulsion No. 8 | 2 cc./min | 99+ |
| Control | 205 cc./min | |
| 5 cc. Emulsion No. 136 | 1 cc./min | 99+ |
| Control | 220 cc./min | |
| 5 cc. Emulsion No. 138 | 3 cc./min | 99+ |

EXAMPLE II.—SEEPAGE REDUCTION—FLOWING WATER

A miniature canal was constructed having the following dimensions:

6 feet long
5½ inches (across top)
3 inches deep

The canal was lined with sand forming an underlying surface of 288 square inches of sand.

The canal was inclined at 5° and 47 cc. of an emulsion were added at the head of the inclined canal. The formulation of the emulsion was as follows:

*No. 61*

| | Percent |
|---|---|
| Asphalt | 65 |
| Water | 35 |
| 1-(2-aminoethyl)-2-alkyl-2-imidazoline | 0.3 |
| Acetic acid (glacial) | 0.1 |
| $CaCl_2$ | 0.1 |

The results of the seepage evaluations were as follows:

TABLE II

|  | Flow Rate at End of 10 Minutes | Percent Reduction |
|---|---|---|
| Control | 137 cc./min | |
| Emulsion No. 61 | 32 cc./min | 76.6 |

EXAMPLE III.—SEEPAGE REDUCTION—FLOWING WATER

Employing the apparatus described in Example II, emulsions having the following formulations were introduced at the head of the canal:

*No. 104*

| | Percent |
|---|---|
| Asphalt | 65 |
| Water | 35 |
| Duomeen T | 1.0 |
| HCl(conc.) | 0.45 |
| $CaCl_2$ | 0.10 |
| Dextrose | 0.10 |

*No. 105-2*

| | |
|---|---|
| Asphalt | 65 |
| Water | 35 |
| Ethoquad O/12[1] | 0.75 |
| $CaCl_2$ | 0.10 |
| Dextrose | 0.10 |

[1] Ethoquad is a trademark applied to polyethoxylated quaternary ammonium salts. The letter "O" is an abbreviation for "oleyl"; the numeral "12" indicates that two moles of ethylene oxide are present in the compound.

*No. 98*

| | |
|---|---|
| Asphalt | 65 |
| Water | 35 |
| Arquad T-50[1] | 1.0 |
| $CaCl_2$ | 0.1 |

[1] Arquad is a trademark applied to N-alkyl quaternary ammonium compounds. The letter "T" indicates that the alkyl group comprises mixtures of aliphatic hydrocarbon radicals such as are derived from tallow. The numeral "50" is a grade designation.

The results, reported in cubic feet of water per square foot of surface area per day (c.s.d.), are as follows:

TABLE III

| Formulation | Initial Seepage, c.s.d. | Reduced Seepage, c.s.d. | Percent Reduction |
|---|---|---|---|
| No. 104 | 5.81 | 1.75 | 70.0 |
| No. 105-2 | 5.67 | 1.04 | 73.8 |
| No. 98 | 6.35 | 1.44 | 77.4 |

EXAMPLE IV.—SEEPAGE REDUCTION—STATIC

Static seepage evaluations were obtained employing a 2½ foot seepage cylinder equipped with an adjustable hydraulic head. The cylinder was provided with a perforated bottom upon which rested a 6 inch layer of a permeable soil. A head of 12 to 18 inches of water was maintained in the cylinder.

The soil layer was treated with the following formulations:

*No. 4*

| | Percent |
|---|---|
| Asphalt | 65 |
| Water | 35 |
| Duomeen T | 0.3 |
| HCl(conc.) | 0.15 |
| $CaCl_2$ | 0.10 |

*No. 5*

| | |
|---|---|
| Asphalt | 65 |
| Water | 35 |
| Ethoduomeen T/13[1] | 0.5 |
| HCl(conc.) | 0.25 |
| $CaCl_2$ | 0.10 |

[1] Ethoduomeen is a trademark applied to polyethoxylated N-alkyl trimethylene diamines. The letter "T" as above the numeral "13" indicates that three moles of ethylene oxide are present in the compound.

*No. 21*

| | Percent |
|---|---|
| Asphalt | 65 |
| Water | 35 |
| Piperazine | 0.3 |
| HCl(conc.) | 0.10 |
| $CaCl_2$ | 0.10 |
| Arquad T-50 | 0.1 |

*No. 22*

| | |
|---|---|
| Asphalt | 65 |
| Water | 35 |
| Piperazine | 0.3 |
| HCl(conc.) | 0.10 |
| Arquad T-50 | 0.10 |

The results, reported in cubic feet of water per square foot of surface area per day (c.s.d.), are as follows:

TABLE IV

| Formulation | Initial Seepage, c.s.d. | Reduced Seepage, c.s.d. | Percent Reduction |
|---|---|---|---|
| No. 4 | 5.86 | 1.59 | 82.0 |
| No. 5 | 5.92 | 1.52 | 86.5 |
| No. 21 | 5.77 | 1.20 | 84.0 |
| No. 22 | 5.79 | 1.50 | 80.0 |

EXAMPLE V

A series of field tests were made in unlined irrigation ditches extending through silty loam soil. Temporary dams were constructed, using polyethylene sheet partitions to form a series of ponds in the irrigation ditches. The ponds varied in length from 25 to 50 feet. The seepage rate (in./hr.) was measured in each pond prior to treatment and at specified time intervals after treatment. The cationic asphalt emulsions were introduced into the ponds at the rate of one-half gallon or one gallon per square yard of wetted perimeter. Four formulations were tested, as set out below:

*Formulation S–1*

|   | Percent |
|---|---|
| Asphalt | 65 |
| Water | 35 |
| Duomeen T | 0.8 |
| Ethomeen 2C/75 | 0.2 |
| HCl (conc.) | 0.45 |
| $CaCl_2$ | 0.10 |

*Formulation S–2*

|   | Percent |
|---|---|
| Asphalt | 65 |
| Water | 35 |
| Arquad T–50 | 1.0 |
| $CaCl_2$ | 0.1 |

*Formulation S–3*

|   | Percent |
|---|---|
| Asphalt | 65 |
| Water | 35 |
| Ethoquad O/12 | 0.5 |
| $CaCl_2$ | 0.1 |

*Formulation S–4*

|   | Percent |
|---|---|
| Asphalt | 65 |
| Water | 35 |
| Duoquad T–50 | 1.0 |
| $CaCl_2$ | 0.1 |

The results of the foregoing tests are summarized below in Tables V, VI and VII.

TABLE V

| Treatment (1 gal./sq. yd.) | Pre-Treat Seepage Rate | Post-Treat Seepage Rate (in./hr.) | |
|---|---|---|---|
| | | After 24 hrs. | After 48 hrs. |
| S-1 | 7.65 | .98 | .86 |
| S-2 | 6.96 | .62 | .69 |
| S-3 | 6.48 | .38 | .69 |

TABLE VI

| Treatment (½ gal./sq. yd.) | Pre-Treat Seepage Rate | Post-Treat Seepage Rate (in./hr.) | |
|---|---|---|---|
| | | After 24 hrs. | After 48 hrs. |
| S-1 | 2.73 | .62 | .69 |
| S-2 | 2.73 | .33 | .69 |
| S-3 | 3.45 | .72 | .77 |

TABLE VII

| Treatment | Seepage Rate (in./hr.) | |
|---|---|---|
| | Pre-Treat | Post (4 hrs.) |
| S-4 (1 gal./sq. yd.) | 4.74 | .29 |
| S-4 (½ gal./sq. yd.) | 3.07 | 1.95 |

EXAMPLE VI

A field test was conducted with a lined irrigation canal. The canal was lined with concrete gunite which was structurally sound but exhibited extensive cracking. Temporary dams were constructed to isolate a section of the canal. This was first filled with untreated water and the water loss was determined at specified time intervals, the measurement being made in total inches loss. The pond area was then drained and refilled to the prior level. The wetted perimeter of the pond section was approximately 400 square yards. 100 gallons of Emulsion No. 14 was introduced into the water, making an application rate of .25 gallon per square yard. The composition of Emulsion No. 14 is set out below, and the results obtained are summarized in Table VIII.

*Emulsion No. 14*

|   | Percent |
|---|---|
| Asphalt | 65 |
| Water | 35 |
| Duoquad T–50 | 0.75 |
| $CaCl_2$ | 0.1 |

TABLE VIII

| | Water Loss (total in.) | | |
|---|---|---|---|
| | 8 hrs. | 16 hrs. | 24 hrs. |
| Untreated | 3 | 4 | 4.5 |
| Post-Treat | .5 | .5 | 1 |
| 30-day Post-Treat | .75 | 1.75 | 1.75 |

In Examples V and VI, reference is made to certain cationic emulsifiers by trade names. The chemical identification of these products is as follows: Duomeen T is tallow 1,3-propylene diamine; Ethomeen 2C/75 is polyethoxylated cocoamine; Arquad T–50 is tallow trimethyl ammonium chloride; Ethoquad O/12 is ethoxylated oleyl trimethyl ammonium chloride; and Duoquad T–50 is N tallow, N-dimethyl, N'N'N'-trimethyl 1,3-propane ammonium chloride.

While this invention has been described and exemplified in terms of its preferred embodiments, those skilled in the art will appreciate that modifications can be made without departing from the spirit and scope of this invention.

We claim:

1. In the storage and utilization of water where the contained body of water is subject to seepage loss by permeation through the walls of the containing material, the method of reducing such seepage loss characterized by dispersing into said body of water a cationic bituminous emulsion having a continuous aqueous phase, a dispersed bituminous phase, and a cationic emulsifier for the bituminous phase, said emulsion being dispersed in such manner as to form in said body of water a dispersion of said bituminous phase of greatly increased dilution as compared with that of said emulsion, whereby the highly dispersed bituminous phase within a relatively short time will deposit on and in said containing material with a reduction in the permeability thereof.

2. The method of claim 1 wherein said containing material is soil.

3. The method of claim 1 wherein said containing material includes a consolidated lining, said lining being permeable due to cracks therethrough.

4. The method of claim 1 wherein said cationic emulsifier is selected from the class consisting of water-soluble salts of polyamine compounds and water-soluble quaternary ammonium compounds, said polyamine and said quaternary ammonium compounds containing an aliphatic hydrocarbon group of from 8 to 22 carbons.

5. In the storage and utilization of water by means of canals, reservoirs, and the like where the contained body of water is subject to seepage loss by permeation of the underlying containing material, the method of reducing said seepage loss characterized by dispersing into said body of water a cationic asphalt emulsion having a continuous aqueous phase, a dispersed asphalt phase, and a quaternary ammonium emulsifier for the asphalt phase, said emulsifier containing at least one quaternary ammonium group and an aliphatic hydrocarbon group of from 12 to 18 carbons, said emulsion being dispersed in such manner as to form in said body of water a dispersion of said bituminous phase of greatly increased dilution as compared with that of said emulsion.

6. In the storage and utilization of water by means of canals, reservoirs, and the like where the contained body of water is subject to seepage loss by permeation of the underlying containing material, the method of reducing said seepage loss, characterized by the dispersing in the said body of water above said containing material a cationic asphalt emulsion having a continuous aqueous phase, a dispersed asphalt phase, and a diamine emulsifier, said emulsifier being in the form of a water-soluble salt and containing an aliphatic hydrocarbon group of from 12 to 18 carbons, said emulsion being dispersed in such manner as to form in said body of water a dispersion of said bituminous phase of greatly increased dilution as compared with that of said emulsion.

7. In the storage and utilization of water by means of canals, reservoirs, and the like, where the contained body of water is subject to seepage loss by permeation of the underlying containing material, the method of reducing said seepage loss, characterized by the step of dispersing into the said body of water above said containing material a cationic asphalt emulsion having a continuous aqueous phase, a dispersed asphalt phase, and a cationic emulsifier for the asphalt phase, said emulsion being dispersed in such manner as to form in said body of water a dispersion of said bituminous phase of greatly increased dilution as compared with that of said emulsion, said dispersed asphalt phase being introduced into said body of water in an amount sufficient to provide an asphalt concentration therein of from 100 to 10,000 p.p.m.

8. The method of claim 7 wherein said containing material is soil.

9. The method of claim 7 wherein said containing material includes a consolidated lining, said lining being permeable due to cracks therethrough.

10. The method of claim 7 wherein said cationic emulsifier is selected from the class consisting of water-soluble salts of polyamine compounds and water-soluble quaternary ammonium compounds, said polyamine compounds and said quaternary ammonium compounds containing an aliphatic hydrocarbon group of from 12 to 18 carbons.

11. The method of claim 7 wherein said emulsifier is tallow trimethyl ammonium chloride.

12. The method of claim 7 wherein said emulsifier is tallow 1,3-propylene diamine chloride.

References Cited by the Examiner

UNITED STATES PATENTS

| 2,706,688 | 4/1955 | Sommer et al. | 106—277 XR |
| 2,760,878 | 8/1956 | Lhorty | 106—277 XR |

FOREIGN PATENTS

| 643,845 | 6/1962 | Canada. |
| 645,098 | 7/1962 | Canada. |

ALEXANDER H. BRODMERKEL, *Primary Examiner.*

MORRIS LIEBMAN, *Examiner.*